(12) United States Patent
Nachenberg

(10) Patent No.: US 8,127,149 B1
(45) Date of Patent: Feb. 28, 2012

(54) METHOD AND APPARATUS FOR CONTENT BASED ENCRYPTION

(75) Inventor: Carey Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 1187 days.

(21) Appl. No.: 11/477,501

(22) Filed: Jun. 29, 2006

(51) Int. Cl.
*H04L 29/06* (2006.01)
(52) U.S. Cl. .............................. 713/193; 726/1
(58) Field of Classification Search .......... 713/188–194; 726/1; 380/30
See application file for complete search history.

(56) References Cited

U.S. PATENT DOCUMENTS

| | | | | |
|---|---|---|---|---|
| 5,778,395 A | * | 7/1998 | Whiting et al. | 707/204 |
| 6,550,011 B1 | * | 4/2003 | Sims, III | 713/193 |
| 7,516,492 B1 | * | 4/2009 | Nisbet et al. | 726/27 |
| 2002/0129140 A1 | * | 9/2002 | Peled et al. | 709/224 |
| 2005/0055399 A1 | * | 3/2005 | Savchuk | 709/203 |
| 2005/0273614 A1 | * | 12/2005 | Ahuja et al. | 713/176 |
| 2006/0149558 A1 | * | 7/2006 | Kahn et al. | 704/278 |
| 2007/0261099 A1 | * | 11/2007 | Broussard et al. | 726/1 |

* cited by examiner

*Primary Examiner* — Hadi Armouche
(74) *Attorney, Agent, or Firm* — Wilmer Cutler Pickering Hale and Dorr LLP

(57) ABSTRACT

A method, system and computer-readable medium for encrypting a file on a computer system based on the content of the file. The method is setting an encryption policy, wherein the encryption policy is at least one attribute related to content of at least one file, scanning at least one file on a computer system for content, matching the content of the scanned at least one file to the at least one attribute set in the encryption policy and encrypting the scanned at least one file with a key in response to a match between the content of the scanned at least one file and the at least one attribute set in the encryption policy. The system is a computer system that includes policy-based encryption software that performs the steps embodied by the method.

16 Claims, 3 Drawing Sheets

METHOD AND APPARATUS FOR CONTENT BASED ENCRYPTION

BACKGROUND OF THE INVENTION

1. Field of the Invention

Embodiments of the present invention generally relate to encryption and, more particularly, encrypting a file on a computer system based on the content of the file.

2. Description of the Related Art

Businesses, organizations and government entities rely on computer systems and storage area networks (SANs) for managing and storing enormous quantities of data and information. Safeguarding the stored data typically includes backing up the stored data and maintaining one or more copies of the stored data at a different physical location than the original data. Further, the stored data may be encrypted to prevent unauthorized use and access to the data.

A "one size fits all" encryption approach to securing data is not always desirable for an organization. In addition to safeguarding data, the organization usually needs to identify and retrieve specific data and information for audit purposes or for compliance with certain governmental regulations. Encrypting all of the stored data in the same way, i.e., using the same encryption methodology and encryption key(s), does not differentiate between the content of the encrypted data. Further, any person with knowledge of the encryption methodology and encryption key can gain access to all of the encrypted data. Thus, conventional encryption techniques do not differentiate between the type of information being stored or the purpose to which the information is related.

Thus, there is a need in the art for a policy-based method of encryption. The method differentiates between different types of data based upon a policy set by the user and then encrypts the data based upon the content of the data.

SUMMARY OF THE INVENTION

The present invention is a method, system and computer-readable medium for encrypting a file, document, email or other data item on a computer system based on the content of the file, document, email or other data item. The method comprises setting an encryption policy, wherein the encryption policy specifies a means of identifying that a file contains a certain type of content, scanning at least one file on a computer system for said content, matching the content of the scanned and encrypting the scanned at least one file with a key in response to a match between the content and the scanned at least one file and the encryption policy. The system is a computer system comprising policy-based encryption software that performs the steps embodied by the method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention is policy-based encryption software for encrypting files on a computer system based on the attributes of the file. The policy-based encryption software can be used to encrypt files, e-mails, instant messages and other data stored on the computer system. A user sets a policy based on one or more keywords, a general topic, or a file attribute, and when the content of a file matches the keyword or the file attribute, the encryption software encrypts the file using a symmetric encryption key. The symmetric encryption key is then encrypted with a public key related to the policy, ensuring that only files related to the policy are decrypted using the encryption key.

Figure 1:
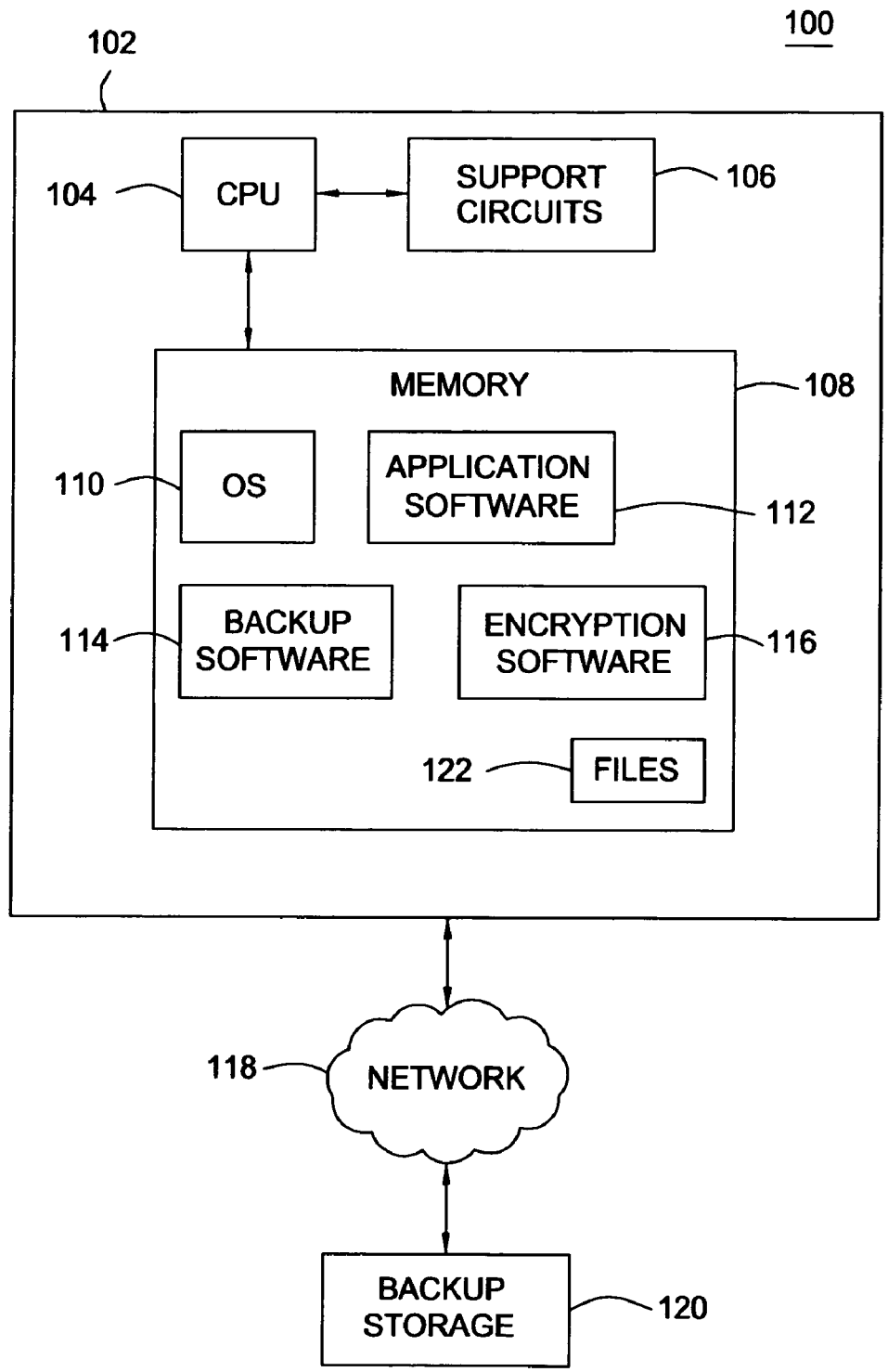
FIG. 1 is a block diagram of a computing environment in which the present invention can function.

FIG. 1 is a computing environment 100 in which the present invention can function. The computing environment 100 comprises a computer system 102 coupled to a backup storage 120 via a communications network 118. The communications network 118 is any conventional network, such as Ethernet or fibre channel, that allows communication of data between the computer system 102 and the backup storage 120. The backup storage 120 may also be a component of the computer system 102, i.e., directly connected to the computer system 102 using a SCSI bus, FIREWIRE, Universal Serial Bus (USB) and the like.

The computer system 102 comprises a central processing unit (CPU) 104, support circuits 106 and a memory 108. The CPU 102 comprises one or more commercially available microprocessors. The support circuits 106 are well known circuits that comprise power supplies, clocks, input/output interface circuitry and the like.

Memory 108 may comprise random access memory, read only memory, removable disk memory, flash memory, and various combinations of these types of memory. The memory 108 is sometimes referred to as main memory and may in part be used as cache memory or buffer memory. The memory 108 stores various software packages, such as an operating system (OS) 110, application software 112, backup software 114 and encryption software 116.

The application software 112 may include database software, word processing software, electronic mail software, collaborative environment software and the like. The application software 112 stores data in one or more associated files 122.

The backup software 114 is software that backs up data, including data files, emails, instant messages, and other data items 122 associated with the application software 112, from the computer system 102 to the backup storage 120 for the purpose of safeguarding and archiving the data. Examples of the backup software 114 include backup software applications such as SYMANTEC GHOST and VERITAS NET-BACKUP and SYMANTEC ENTERPRISE VAULT. The backup software 114 works in conjunction with the encryption software 116 to back up encrypted data to the backup storage 120

The backup storage 120 may be a storage area network (SAN), a hard drive, digital linear tape (DLT) drive or any physical device commonly used to store data. The backup storage 120 is shown as separate and remote to the computer system 102, but the backup storage 120 can also be a component of the computer system 102.

The encryption software 116 is policy-based encryption software that operates in accordance with the present invention. The encryption software 116 scans each data file 122 and encrypts each data file 122 based on content and a policy set by the user. For example, assume the user wants to encrypt and back up only files on the computer system 102 related to an "annual report". The encryption software 116 utilizes the policy, i.e., rules set by the user, to identify files 122 that are relevant and need to be encrypted.

The encryption software 116 identifies the relevant files by scanning each file 122 for content set by the user in the policy. The content may be one or more keywords such as "annual report", "privileged", or "confidential". The encryption software 116 may identify these keywords by comparing character strings within each file 122 against keywords set in the policy. In another embodiment, techniques such as Latent Semantic Indexing (LSI), word stemming, etc. may be used to identify files that contain content that matches the specified policy without strictly requiring an exact keyword match.

The encryption software 116 may also identify relevant files by the file attributes, e.g., size, location, file type, file name. The user may specify in the policy all word processing documents as relevant. In which case, the encryption software 116 will identify any file type ending in ".doc" or any file associated with a word processor application such as MICROSOFT WORD by the operating system 110 as a relevant file. The user may also specify in the policy that only files created after a certain date are relevant or that files located within a certain directory are relevant. Or, the user may specify that all emails sent by a particular user should be considered relevant.

The user may also specify a combination of content and file attributes in the policy for selecting a relevant file. For example, the user may specify only files containing the word "annual report" created after Jan. 1, 2000 as relevant. Thus, the encryption software 116 would select relevant files based upon the content and the file attributes.

The encryption software 116 is also capable of identifying content specified in the policy within audio and media files by using speech-to-text conversion technology. Speech-to-text conversion technology is well-known in the art. The encryption software 116 identifies a file as an audio file, converts the audio to text, and then employs a character search string as discussed above to identify the content set in the policy. By using speech-to-text conversion technology and a character string search, the present invention can identify relevant content present in recorded telephone conversations and voicemails stored in a file on the computer system 102.

The encryption software 116 can also use thesaurus, dictionary and spellchecking functions to identify files that contain relevant content that do not exactly match the settings of policy. For example, the policy may specify all files containing the word "privileged" as relevant. By using the spellchecking function, the encryption software 116 can identify files that contain the word "privledged", "priveleged" or any other misspelling as relevant. The thesaurus and dictionary functions enable the encryption software 116 to identify files containing terms such as "privilege" and "confidential" as relevant or potentially relevant even though these terms are not specified in the policy.

The user can specify within the policy whether an exact match must be made between the keywords and the files identified by the encryption software 116. A greater number of files will be identified by the encryption software 116 as relevant if an exact match between a keyword of the policy and a word in the content of a file is not required. The user can also select files very specifically to be encrypted 116 by specifying an exact match between a keyword of the policy and a word in the content of the file.

The encryption software 116 encrypts the identified relevant files using one of several well-known encryption standards. In one embodiment of the invention, the encryption software 116 utilizes the Advanced Encryption Standard (AES) to encrypt the relevant files using a symmetric encryption key. Other symmetric encryption standards include Blowfish, Data Encryption Standard (DES), Bluefish and IDEA. The encryption software 116 then encrypts the symmetric encryption key, for example the AES key, used to encrypt the relevant files with an asymmetric (e.g. public/private key encryption) encryption standard such as Diffie-Hillman, RSA or Elliptic Curve encryption.

A given asymmetric public/private key pair is related to a category of data. For example, we may associate one asymmetric public/private key pair to all files containing the word "acquisition" and another asymmetric public/private key pair to all files containing the word "stock offer." If a given file matches a category in the policy, then it will be encrypted with a randomly generated symmetric key, and then this symmetric key will be further encrypted by the public asymmetric key associated with this content category. If a file is associated with more than one content category (i.e. it contains information on stock offers and acquisitions), then the symmetric key used to encrypt the file may be encrypted by the public asymmetric keys of both categories. A user wishing to view the encrypted files (for instance, for legal discovery purposes) can decrypt the symmetric encryption key using the private key, which is held in escrow by the encrypter until such time as it is needed for discovery. Once the symmetric encryption key, e.g., the AES key, is decrypted by the private asymmetric key, the encrypted files containing the keywords, e.g., "acquisition" or "stock offer", can be decrypted with the symmetric key and the content of the files accessed by the recipient in a usable form.

An encryption key may be encrypted by more than one public key. For example, a public key may be related to the policy keyword "annual report" and another public key related to the policy keyword "confidential". A user wishing to examine files containing either category of content would be capable of decrypting a relevant file that contained the words "annual report" and "confidential" if he was in possession of either one of the public keys related to those particular keywords.

By relating the public/private key pairs to particular keywords set within a policy, a user can control what information is accessible to an auditor or other user in need of viewing a subset of the data. The recipient can only access encrypted data related to a particular public key. Thus, the user can control access to the encrypted data by distributing to the auditor a private key that allows the recipient to access only relevant data specified as set by the user in the policy.

Figure 2:
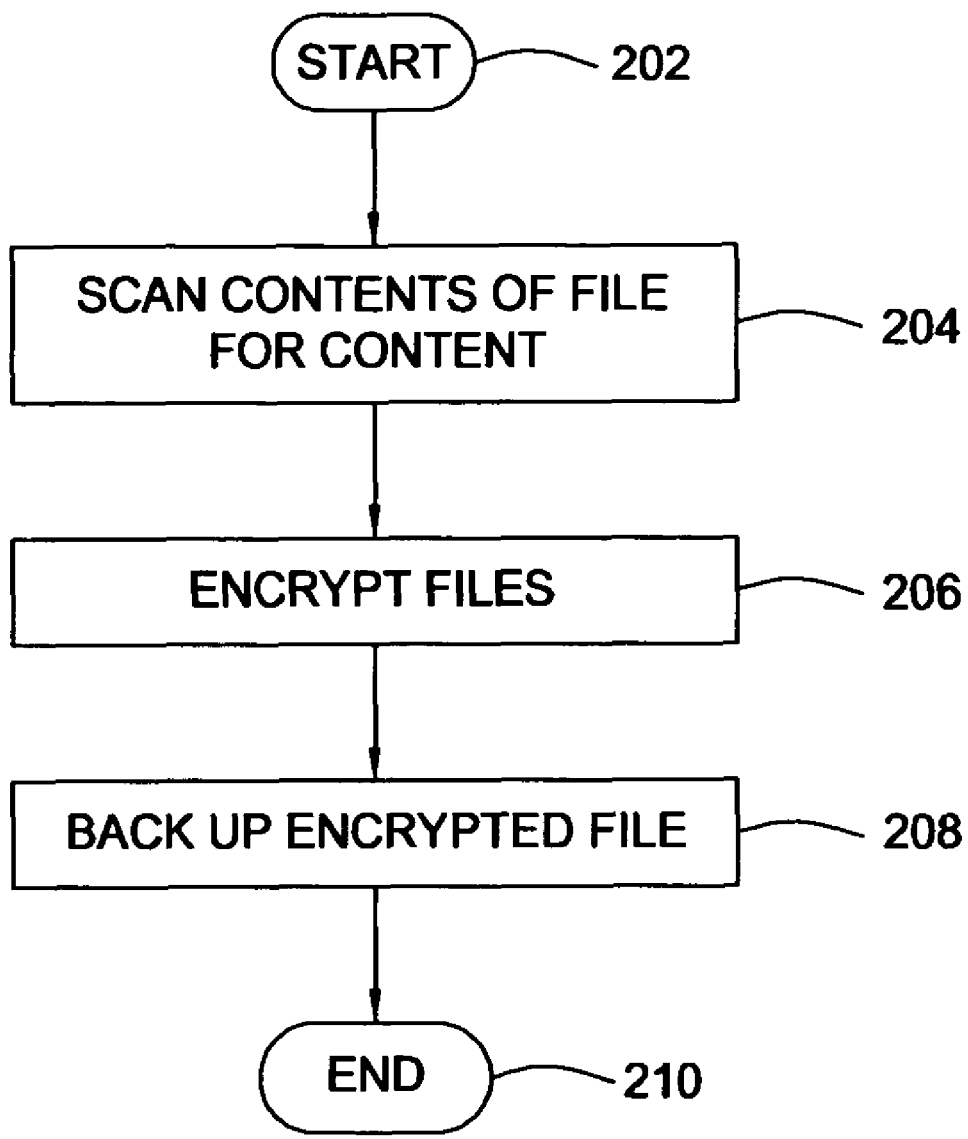
FIG. 2 is a flow diagram of a policy-based encryption method.

FIG. 2 is a flow diagram of a method 200 for policy-based encryption of data. The method 200 starts at step 202 and proceeds to step 204. At step 204, encryption software 116 scans files 122 on a computer system for content specified in a policy.

The policy specifies one or more keywords or file attributes that identify a file as relevant. As discussed above, content may be identified by matching a character string within the file to a keyword set within the policy, or matching a file creation date to a file attribute set within the policy. The encryption software 116 may also utilize speech-to-text technology to identify relevant content present in an audio file.

At step 206, the encryption software 116 encrypts the files identified at step 204 using an encryption standard such as AES. Encryption standards such as AES, Blowfish, DES, Bluefish and IDEA are well known in the art. At step 208, backup software 114 backs up the encrypted files to a backup storage 120. The encryption software 116 and backup software 114 may be components of the same software program. The encryption software 116 and backup software 114 function together to back up and safeguard data in a secure manner.

Backing up the encrypted data is only an example of one possible use for the invention. The encrypted data may also be stored on the computer system 102, e-mailed to another user, etc. The method 200 ends at step 210.

Figure 3:
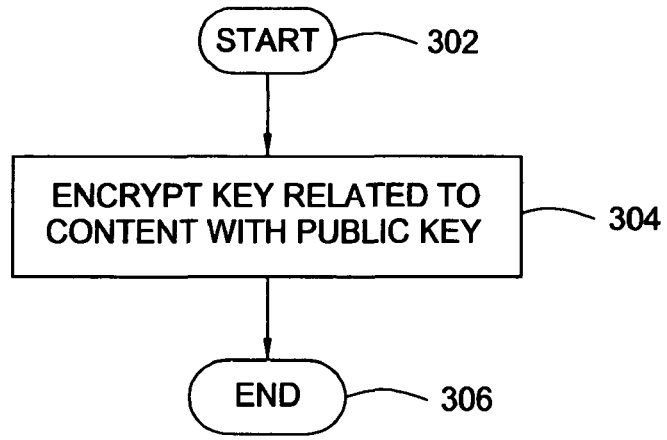
FIG. 3 is a flow diagram of a method for encrypting an encryption key with a public key.

FIG. 3 is a flow diagram of a method 300 for encrypting an encryption key with a public key. The method 300 starts at step 302 and proceeds to step 304. At step 304, the encryption key utilized by encryption software 116 is encrypted with a public encryption key. The public encryption method is a standard such as Diffie-Hillman, RSA or Elliptic Curve encryption. The method ends at step 306.

Figure 4:
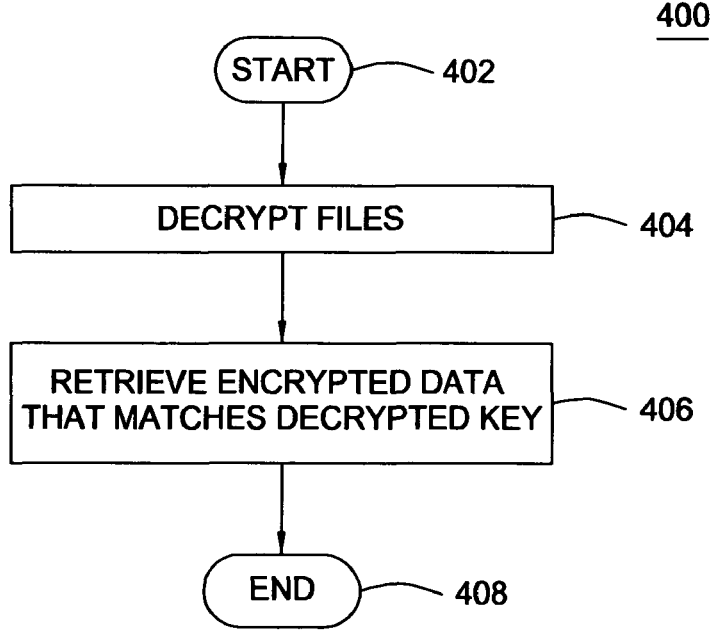
FIG. 4 is a flow diagram of a method for retrieving data encrypted by a policy-based encryption method.

FIG. 4 is a flow diagram of a method 400 for decrypting data encrypted by the policy-based encryption method 200. The method 400 starts at step 402 and proceeds to step 404. At step 404, a recipient of encrypted files decrypts an encryption key. The recipient is in possession of one or more private keys. The sender of the encrypted data provides the recipient with the encrypted files and the appropriate private key. The recipient uses the private key to decrypt the encrypted symmetric key. At step 406, the recipient uses the decrypted symmetric key to decrypt the encrypted files.

The private key can only decrypt an associated symmetric encryption key. Thus, control of access to the private key also controls access to the encryption key. The private encryption key will only provide access to files previously encrypted by that particular private encryption key. The method 400 ends at step 408.

While the foregoing is directed to embodiments of the present invention, other and further embodiments of the invention may be devised without departing from the basic scope thereof, and the scope thereof is determined by the claims that follow.

In one embodiment, the invention is a computer-readable medium having stored thereon a plurality of instructions. The plurality of instructions include instructions which, when executed by a processor, cause the processor to perform a series of steps. The steps include scanning at least one file on a computer system for content, matching the content of the scanned at least one file to at least one attribute set in an encryption policy, and encrypting the scanned at least one file with a key in response to a match between the content of the scanned at least one file and the at least one attribute set in the encryption policy.

The invention claimed is:

1. A method of encryption comprising:
   scanning at least one file on a computer system for at least one attribute defined in an encryption policy, wherein the at least one attribute relates to content of the at least one scanned file, and wherein the at least one attribute is one or more keywords defined in the encryption policy associated with a particular type of content;
   matching the content of the at least one scanned file to the at least one attribute defined in the encryption policy, wherein the encryption policy selects an encryption method from a plurality of encryption methods corresponding to the one or more keywords identified by a match between the content of the at least one scanned file and the at least one attribute, and wherein the encryption method is associated with the particular type of content contained within the at least one scanned file;
   encrypting the at least one scanned file using the selected encryption method and a symmetric key; and
   encrypting the symmetric key with a public key, wherein the public key is related to the one or more keywords defined in the encryption policy.

2. The method of claim 1 wherein the content of the file comprises text data and audio data.

3. The method of claim 2 further comprising converting the audio data to text data using a speech-to-text converter.

4. The method of claim 3 wherein the step of matching further comprises at least one of comparing a character string of text data to the one or more keywords defined in the encryption policy, utilizing latent semantic indexing to match the character string of text data to the one or more keywords defined in the encryption policy, and utilizing a spellchecking function to match the character string of text data to the one or more keywords defined in the encryption policy.

5. The method of claim 1 wherein the step of encrypting further comprises encrypting the at least one scanned file using at least one of an Advanced Encryption Standard (AES) key, a Blowfish key, a Data Encryption Standard (DES) key, a Bluefish key and an IDEA key.

6. The method of claim 1 wherein the public key is as a Diffie-Hillman encryption key, an RSA encryption key or an Elliptic Curve encryption key.

7. The method of claim 1 further comprising backing up the at least one encrypted file to a backup storage.

8. A system for encrypting data comprising:
   a computer system comprising encryption software for encrypting files using an encryption method selected by a policy and a symmetric key, wherein the encryption method is performed using at least one attribute of the files, and wherein the policy selects the encryption method from a plurality of encryption methods corresponding to the at least one attribute, wherein the encryption method is associated with a particular type of content contained within at least one scanned file, wherein the at least one attribute is one or more keywords defined in the encryption policy associated with the particular type of content, and wherein the symmetric key is encrypted with a public key that is related to the one or more keywords defined in the encryption policy; and
   a backup system for storing the encrypted files.

9. The system of claim 8 wherein the computer system further comprises backup software for backing up the encrypted files to the backup system.

10. A non-transitory computer-readable medium having stored thereon a plurality of instructions, the plurality of instructions including instructions which, when executed by a processor, cause the processor to perform the steps of:

scanning at least one file on a computer system for content;

matching the content of the at least one scanned file to at least one attribute defined in an encryption policy, wherein the encryption policy selects an encryption method from a plurality of encryption methods corresponding to one or more keywords identified by a match between the content of the at least one scanned file and the at least one attribute defined in the encryption policy, wherein the encryption method is associated with a particular type of content contained within the at least one scanned file, and wherein the at least one attribute is the one or more keywords defined in the encryption policy associated with the particular type of content;

encrypting the at least one scanned file using the selected encryption method and a symmetric key; and encrypting the symmetric key with a public key, wherein the public key is related to the one or more keywords defined in the encryption policy.

11. The non-transitory computer-readable medium of claim 10 wherein the content of the file comprises text data and audio data.

12. The non-transitory computer-readable medium of claim 11 further causing the processor to perform the steps of converting the audio data to text data using a speech-to-text converter.

13. The non-transitory computer-readable medium of claim 12 further causing the processor to perform at least one of the steps of comparing a character string of text data to the one or more keywords defined in the encryption policy, utilizing latent semantic indexing to match the character string of text data to the one or more keywords defined in the encryption policy, and utilizing a spellchecking function to match the character string of text data to the one or more keywords defined in the encryption policy.

14. The non-transitory computer-readable medium of claim 10 further causing the processor to perform the steps of encrypting the at least one scanned file using at least one of an Advanced Encryption Standard (AES) key, a Blowfish key, a Data Encryption Standard (DES) key, a Bluefish key and an IDEA key.

15. The non-transitory computer-readable medium of claim 10 further causing the processor to perform the steps of backing up the at least one encrypted file to a backup storage.

16. The method of claim 1 further comprising setting an encryption policy, wherein the encryption policy comprises at least one attribute related to content of at least one file of the computer system.

* * * * *